United States Patent
Duffy et al.

(10) Patent No.: US 7,377,270 B2
(45) Date of Patent: May 27, 2008

(54) EXHAUST GAS RECIRCULATION IN A HOMOGENEOUS CHARGE COMPRESSION IGNITION ENGINE

(75) Inventors: Kevin P. Duffy, Metamora, IL (US); Andrew J. Kieser, Morton, IL (US); Anthony Rodman, Chillicothe, IL (US); Michael P. Liechty, Chillicothe, IL (US); Carl-Anders Hergart, Peoria, IL (US); William L. Hardy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/584,889

(22) Filed: Oct. 23, 2006

(65) Prior Publication Data

US 2008/0092861 A1 Apr. 24, 2008

(51) Int. Cl.
*F02B 47/08* (2006.01)
*F02B 47/10* (2006.01)

(52) U.S. Cl. .............................. 123/568.12; 123/568.11; 60/605.2

(58) Field of Classification Search ........... 123/568.11, 123/568.12, 568.15, 568.17, 568.18; 60/605.2, 60/280
See application file for complete search history.

(56) References Cited

U.S. PATENT DOCUMENTS

| | | | | |
|---|---|---|---|---|
| 5,309,886 A | * | 5/1994 | Hitomi et al. | 60/605.2 |
| 6,301,888 B1 | * | 10/2001 | Gray, Jr. | 60/605.2 |
| 6,470,682 B2 | * | 10/2002 | Gray, Jr. | 60/605.2 |
| 6,561,157 B2 | | 5/2003 | Zur Loye et al. | |
| 6,651,432 B1 | * | 11/2003 | Gray, Jr. | 60/605.2 |
| 6,725,838 B2 | | 4/2004 | Shafer et al. | |
| 6,918,251 B2 | * | 7/2005 | Yanagisawa et al. | 60/605.2 |
| 6,968,678 B2 | * | 11/2005 | Le Leux et al. | 60/280 |
| 6,981,375 B2 | * | 1/2006 | Sisken et al. | 60/612 |
| 7,036,482 B2 | | 5/2006 | Beck et al. | |
| 7,080,511 B1 | * | 7/2006 | Bolton et al. | 60/611 |
| 2003/0066509 A1 | | 4/2003 | Shafer et al. | |
| 2003/0116124 A1 | | 6/2003 | Lawrence et al. | |
| 2004/0112326 A1 | | 6/2004 | Coleman et al. | |
| 2005/0051136 A1 | | 3/2005 | Malaczynski et al. | |

(Continued)

FOREIGN PATENT DOCUMENTS

DE 197 56 060 12/1998

(Continued)

OTHER PUBLICATIONS

PCT International Search Report; Applicant Ref. No.: 06-255; International Appln. No.: PCT/US2007/013603; Filing Date Jun. 8, 2007; Applicant: Caterpillar Inc.

*Primary Examiner*—Mahmoud Gimie
(74) *Attorney, Agent, or Firm*—Liell & McNeil

(57) ABSTRACT

A homogeneous charge compression ignition engine operates by injecting liquid fuel directly in a combustion chamber, and mixing the fuel with recirculated exhaust and fresh air through an auto ignition condition of the fuel. The engine includes at least one turbocharger for extracting energy from the engine exhaust and using that energy to boost intake pressure of recirculated exhaust gas and fresh air. Elevated proportions of exhaust gas recirculated to the engine are attained by throttling the fresh air inlet supply. These elevated exhaust gas recirculation rates allow the HCCI engine to be operated at higher speeds and loads rendering the HCCI engine a more viable alternative to a conventional diesel engine.

13 Claims, 2 Drawing Sheets

U.S. PATENT DOCUMENTS

| | | |
|---|---|---|
| 2005/0103013 A1 | 5/2005 | Brookshire et al. |
| 2005/0241302 A1* | 11/2005 | Weber et al. .................. 60/311 |
| 2005/0247284 A1* | 11/2005 | Weber et al. ................ 123/299 |
| 2006/0112911 A1 | 6/2006 | Lawrence et al. |
| 2006/0112928 A1 | 6/2006 | Coleman et al. |
| 2006/0150628 A1* | 7/2006 | Bolton et al. ............... 60/605.2 |
| 2006/0236693 A1* | 10/2006 | Wei et al. ................... 60/605.1 |
| 2006/0266018 A1* | 11/2006 | Durand ......................... 60/276 |
| 2007/0012040 A1* | 1/2007 | Nitzke et al. ............... 60/605.2 |
| 2007/0027608 A1* | 2/2007 | Durand et al. .............. 701/103 |
| 2007/0044472 A1* | 3/2007 | Zhang ....................... 60/605.2 |
| 2007/0074508 A1* | 4/2007 | Tomlins et al. ............... 60/297 |

FOREIGN PATENT DOCUMENTS

| | | |
|---|---|---|
| EP | 1 420 159 A2 | 5/2004 |
| JP | 2002-285879 | 10/2002 |
| JP | 2005-330811 | 12/2005 |
| JP | 2006-57570 | 3/2006 |
| JP | 2006-70878 | 3/2006 |
| WO | WO 2006/058339 A2 | 6/2006 |
| WO | WO 2007/117369 A1 | 10/2007 |

* cited by examiner

EXHAUST GAS RECIRCULATION IN A HOMOGENEOUS CHARGE COMPRESSION IGNITION ENGINE

This invention was made with Government support under DOE Contract No. DE-FC26-05NT4 2412 awarded by the U.S. Department of Energy. The Government has certain rights to this invention.

TECHNICAL FIELD

This disclosure relates generally to homogeneous charge compression ignition (HCCI) engines, and more particularly to an exhaust gas recirculation system that facilitates elevated levels of exhaust gas recirculation.

BACKGROUND

A relatively new combustion strategy known as homogeneous charge compression ignition shows great promise in reducing undesirable emissions from internal combustion engines that utilize a compression ignition strategy. HCCI refers generally to the idea of mixing fuel with air in the engine cylinder before autoignition conditions arise. The mixture is compressed to autoignition, with a general desirability that the combustion event take place in the vicinity of top dead center. Although HCCI has proven the ability to drastically reduce undesirable emissions, especially NOx, the combustion strategy has brought new problems that must be overcome in order to render such an engine commercially viable. For instance, for an HCCI engine to be a viable alternative to a counterpart diesel engine, it must have the ability to operate effectively over a relatively wide load range. One problem encountered with HCCI engines is the extreme sensitivity and difficulty in controlling ignition timing. In addition, HCCI engines can have difficulty in operating in higher load ranges where more fuel is supplied to the individual cylinder. This perceived limitation may be due to extreme pressure spikes that occur when the charge burns. The pressures can get so high as to exceed the structural containment capability of an engine housing. Thus, controlling an HCCI engine, especially at higher speeds and loads, can be extremely problematic, but must be overcome to enable such an engine to be a viable alternative to a counterpart diesel engine.

One strategy for dealing with the problems of HCCI is described in co-owned U.S. Pat. No. 6,725,838. This reference describes a mixed mode strategy where HCCI is employed over a lower load range portion of the engine, and conventional diesel engine strategies are employed at high speeds and loads. By conventional, this disclosure means that fuel is injected directly into an engine cylinder after autoignition conditions have arisen, with the injection taking place in the vicinity of top dead center. While a mixed mode strategy can produce superior emissions compared to that of a conventional diesel engine, it requires increased complexity, especially in manufacturing and controlling the fuel system, but mixed mode still results in more undesirable emissions than that possible with an entirely HCCI operation strategy.

The present disclosure is directed toward one or more of the problems set forth above.

SUMMARY OF THE INVENTION

In one aspect, a method of operating an engine includes supplying a mixture of exhaust and fresh air to a combustion chamber. Liquid fuel is injected into the combustion chamber, and the fuel mixes with the exhaust/air mixture. The fuel/air/exhaust mixture is compressed to an autoignition condition of the fuel. A proportion of exhaust gas supplied to the combustion chamber is increased by throttling a fresh air supply passage.

In another aspect, an engine includes a housing having at least one combustion chamber and a fuel injector positioned for direct injection of liquid fuel into each combustion chamber. An exhaust passage extends between the engine housing and a turbocharger. At least one outlet from the turbocharger has a first branch connected to an exhaust gas recirculation system, and a second branch connected to a tail pipe. A fresh air supply passage is connected to the exhaust gas recirculation system. A throttle control valve is positioned in the fresh air supply passage. An engine controller is configured to compress a mixture of fuel with air and exhaust gas in the combustion chamber through an autoignition condition of the fuel. The controller is also configured to increase a proportion of exhaust gas supplied to the combustion chamber by actuating the throttle control valve.

DETAILED DESCRIPTION

Figure 1:
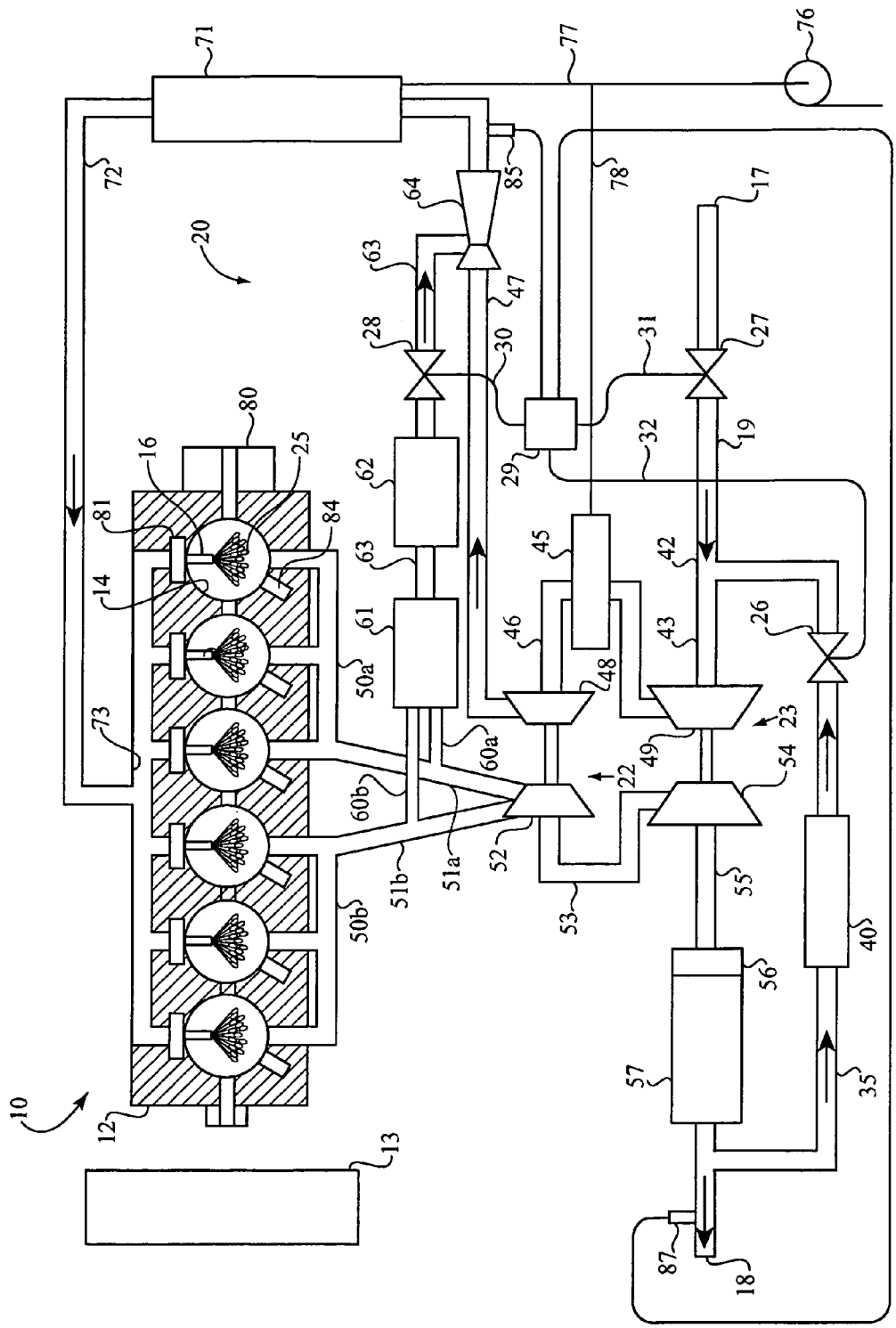
FIG. 1 is a schematic illustration of a homogeneous charge compression ignition engine according to one aspect of the present disclosure.

Referring to FIG. 1, a homogeneous charge compression ignition engine 10 includes an engine housing 12 that includes a plurality of cylinders or combustion chambers 14 disposed therein. In the illustrated embodiment, engine 10 includes six cylinders 14, but those skilled in the art will appreciate that engine 10 could include any number of cylinders without departing from the present disclosure. Engine 10 includes a conventional radiator 13 along with a cooling system (not shown) to cool the engine in a conventional manner. Each cylinder 14 preferably includes a fuel injector 16 positioned for direct injection of liquid fuel into the individual cylinders. Furthermore, each fuel injector may include a nozzle tip configured to produce a shower head spray pattern 25 in which fuel injection plumes point at a plurality of different angles with respect to a fuel injector centerline. Furthermore, the fuel injection holes may be constructed using known laser drilling techniques to achieve extremely small diameter openings, which may be on the order of 80-100 microns. Those skilled in the art will appreciate that the small holed shower head spray pattern can facilitate better fuel and air mixing, and possibly permit lower injection pressures without wetting the walls of cylinder 14, which could produce undesirable unburnt hydrocarbon emissions and/or particulate matter.

Engine 10 may also be equipped with a variable compression ratio control device 80 that allows for the compression ratio of all cylinders 14 to be adjusted simultaneously. Although the variable compression ratio control device 80 could take on a variety of forms, it may have a structure similar to that described in co-owned published United States Patent Application 2006/0112911. In that disclosure, an eccentric crank variable compression ratio mechanism raises and/or lowers the crankshaft in the engine housing to alter the compression ratio of all of the cylinders uniformly. Nevertheless, those skilled in the art will appreciate that any appropriate strategy for varying compression ratio may be considered appropriate for an engine 10 according to the present disclosure. Those skilled in the art will appreciate that having the ability to vary compression ratio can render the problem of combustion control timing and the problem associated with extremely high pressures during combustion more manageable than with a fixed compression ratio engine.

Engine 10 may also be constructed to include variable intake valve actuators 81 as an alternative, or in addition to, the variable compression ratio device 80. Those skilled in the art will appreciate that the variable intake valve actuator can also take on a variety of forms, such as purely electronically controlled, or a hybrid that uses cam actuation and a special hydraulic actuator to hold the intake valve open beyond a cam dictated valve closing timing. The later alternative is described, for instance, in co-owned published U.S. Patent Application 2003/0116124. This variable timing capability can also be exploited to adjust compression ratio in the individual cylinders by adjusting the timing at which the intake valve closes. Engine 10 may also be equipped with variable exhaust valves (not shown) as an alternative, or in addition to the variable intake valve actuators 51. Unlike the variable compression ratio device 80, each individual cylinder includes an individually controllable variable intake valve actuator 81, which allows the behavior of each cylinder 14 to be individually controlled. Preferably, engine 10 is equipped with both a variable compression ratio device 80 and variable intake valve actuators 81 that allow en banc adjustments of all cylinders 14 via the variable compression ratio device 80, and then finer and faster control of individual cylinders 14 via the variable intake valve actuators 81.

Engine 10 may also be equipped with some means for detecting the timing of combustion events in each individual cylinder 14 so that that information can be fed back to a combustion controller, which may then use that information to adjust combustion timing for a subsequent event. In the illustrated embodiment, an individual combustion pressure sensor or an ion sensor 84 is associated with each of the individual cylinders 14. Nevertheless, those skilled in the art will appreciate that any single or multiple sensor strategy that permits the timing of combustion events in each of the cylinders 14 to be determined in real time would be suitable for engine 10 of the present disclosure, and may be desirable to better enable closed loop combustion timing control.

Engine 10 also includes a fresh air inlet 17, a tail pipe 18 and an exhaust gas recirculation system 20. A combination of fresh air and exhaust gas are supplied to engine intake manifold 73 via an engine intake passage 72, which is separated from an air/exhaust gas passage 70 by an air-to-air after cooler 71. Those skilled in the art will appreciate that cooler 71 may include measures, such as being made at least partially from stainless steel, to resist the corrosive influences of exhaust gas passing therethrough. In addition, cooler 71 may include any suitable heat exchanger, including liquid to gas, etc. Exhaust from the individual cylinders 14 collect in first and second exhaust manifolds 50a and 50b, which are respectively connected to exhaust passages 51a and 51b. Nevertheless, those skilled in the art will appreciate that a single exhaust manifold and exhaust passage could be utilized without departing from the scope of the present disclosure. The exhaust passages 51a and 51b feed into a turbine 52 of a turbocharger 22 in a conventional manner. However, a portion of the exhaust that would otherwise go to turbine 52 is instead routed into branch recirculation passages 60a and 60b, which merge in the vicinity of a coated diesel particulate filter 61. Those skilled in the art will appreciate that particulate filter 61 may be coated with any suitable catalyst for any desired purpose, such as to clean the high pressure exhaust being recirculated via these passages. In addition, those skilled in the art will appreciate that particulate filter 57 is preferably positioned in close enough proximity to cylinders 14 that it can be regenerated via heat supplied by the engine. Alternatively, a separate auxiliary regeneration device, which produces its own heat, may be positioned in close proximity to particulate filter 61 to facilitate its regeneration. After passing through particulate filter 61, the high pressure exhaust passes through a clean gas intake cooler 62 and a control valve 28 before connecting to the throat of a venturi 64, which empties into air/exhaust gas return passage 70. Control valve 28 may take on a variety of forms, but may be a relatively simple two-position valve that is never fully closed. For instance, the flow area through control valve 28 in its first position may be chosen to facilitate a desired exhaust gas recirculation level associated with low load or idle positions, and a second or more fully open position may be associated with higher speeds and loads to facilitate higher volumes of exhaust gas recirculation. Nevertheless, control valve 28 may have more than two positions, and may even include a fully closed position, if desired. Control valve 28 is controlled by an electronic control module 29 via a communication line 30 in a conventional manner.

Medium pressure exhaust gas leaves an axial passage from turbine 52 into an inter turbine passage 53, which connects to a turbine 54 of a second turbocharger 23 which is in series with turbocharger 22. Turbine 54 may be an axial turbine, and its lower pressure axial outlet empties into turbine outlet 55. Before arriving at tail pipe 18, the relatively low pressure exhaust is passed through a coated diesel particulate filter 57, which may include any suitable catalyst to treat the exhaust prior to exiting tail pipe 18. Because particulate filter 57 may be relatively remote from the heat of the individual cylinders 14, an auxiliary regeneration device 56 may be included in order to provide the heat necessary to regenerate particulate filter 57. After exiting particulate filter 57, a portion, which may be all of the exhaust gas, exits at tail pipe 18. However, a portion of that low pressure exhaust may be recirculated via low pressure exhaust passage 35. The low pressure exhaust gas is cooled in a clean gas intake cooler 40 prior to encountering a control valve 26. Control valve 26 may have a plurality of discreet positions, or may have a complete continuum of positions from a fully closed to a fully opened position, depending upon the desired action and sophistication of the exhaust gas recirculation system 20. Control valve 26 may be controlled by electronic control module 29 via communication line 32.

Fresh air entering fresh air inlet 17 passes through a throttle control valve 27 prior to entry into a fresh air supply passage 19, which merges with low pressure exhaust passage 35 at a tee connection 42. Throttle control valve 27 is controlled in its positioning by electronic control module 29 via a communication line 31. Those skilled in the art will appreciate that throttle control valve 27 may have a continuum of positions ranging from a restricted fully throttled position that still allows some fresh air to enter the system, to an unrestricted fully open position. The mixture of low pressure exhaust gas and fresh air is supplied to compressor 49 of turbocharger 23 via compressor supply passage 43. Those skilled in the art will appreciate that compressor 49 may include measures, such as use of corrosion resistant titanium, to deal with the corrosive influence, if any, existing in the exhaust gas passing through the compressor. An inter compressor passage 46 connects compressor 49 to compressor 48 of turbocharger 22. An inter cooler 45 may be included in inter compressor passage 46 to cool the compressed exhaust/air mixture. In addition, cooler 45 may include corrosion resistant materials, such as stainless steel, to avoid or reduce the corrosion influences, if any, of the exhaust gas. Like compressor 49, compressor 48 may include corrosive resistant materials such as titanium, to reduce or avoid corrosive influences from the exhaust gas.

A air/exhaust mixture passage 47 fluidly connects the outlet of compressor 48 to the inlet of venturi 64. Thus, venturi 64 represents the mixing location for exhaust from the high pressure side of the exhaust gas recirculation system 20 with low pressure exhaust that originated near the tail pipe, but has had its pressure boosted as a result of passing through compressors 48 and 49.

If desired, coolers 45 and 71 may be connected to a condensate pump 76 via respective condensate passages 78 and 77, to facilitate removal of collected condensed water and other liquids in coolers 45 and 71 in a conventional manner. Although not necessary, engine 10 may also include one or more NOx/lambda sensors 85 and 87 at specific locations in order to allow for gas constituent levels to be monitored during operation of engine 10. In particular, the lambda sensor 85 may monitor the contents of several different gases in air/exhaust gas return passage 70, and this information may be used to further facilitate combustion control of combustion events in the individual cylinders 14. In addition, a separate lambda sensor 87 may be useful in monitoring the constituents of the exhaust gas exiting at tail pipe 18.

Although engine 10 is illustrated as including staged turbochargers 22 and 23, those skilled in the art will appreciate that the engine could include a single turbocharger without departing from the scope of the present disclosure. In such a case, the high pressure exhaust return could connect upstream from the turbocharger, whereas the low pressure exhaust gas return would connect downstream from the same. Those skilled in the art will appreciate that the relative proportions of exhaust gas to fresh air are controlled by electronic control module 29 by appropriately positioning control valves 26, 27 and 28. When the relatively high proportions of EGR are demanded, such as on the order of 50% or more, electronic control module 29 throttles control valve 27 to restrict the supply of fresh air, and moves valves 26 and 28 towards there fully opened positions to enable the higher ratios of exhaust gas recirculation associated with desired operating conditions at higher speeds and loads for engine 10.

Figure 2:
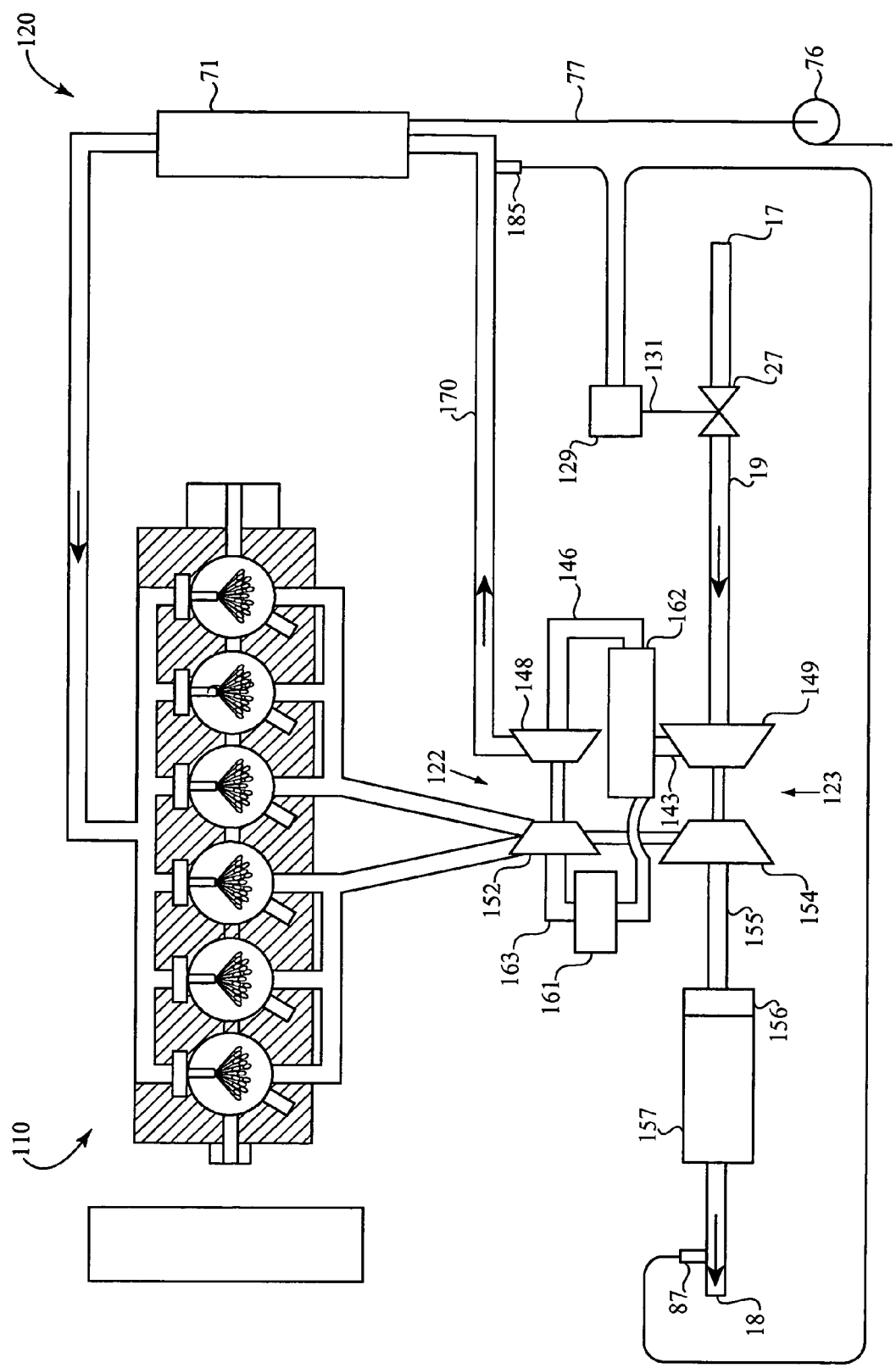
FIG. 2 is a second embodiment of an engine schematic according to the present disclosure.

Referring now to FIG. 2, a homogeneous charge compression ignition engine 110 is shown with many features that are identical to engine 10 described earlier. However, the exhaust gas recirculation system 120 includes several differences relative to the exhaust gas recirculation system 20 described in relation to engine 10. In particular, while exhaust gas recirculation system 120 includes a pair of staged turbochargers 122 and 123 in series, there is only a single medium pressure exhaust gas recirculation 163 rather than the separate high and low pressure exhaust gas return passages associated with engine 10. In exhaust gas recirculation passage 120, the exhaust gas is supplied to turbine 152 of turbocharger 122 and the medium pressure exhaust gas exits turbine 152 via an axial passage connected to medium pressure exhaust gas recirculation passage 163, and via a separate inter turbine passage 153 that connects to turbine 154 of turbocharger 123. The low pressure exhaust then exits turbine 154, which may be an axial turbine, and empties into turbine outlet 155 before passing through a coated diesel particulate filter 157. As in the previous embodiment, the particulate filter 157 may include any suitable catalyst coating and may include any auxiliary regeneration device 156 that generates the heat necessary to regenerate particulate filter 157. After traversing particulate filter 157, the exhaust gas passes a NOx/lambda sensor 187 on its way out of the tail pipe 18.

The medium pressure exhaust exiting turbine 152 into medium pressure exhaust recirculation passage 163 passes through a coated diesel particulate filter 161 and then enters a clean gas intake inter cooler 162. Meanwhile, fresh air enters at fresh air intake 17 and passes through a throttle control valve 27 into a fresh air supply passage 19. The fresh air is then compressed in compressor 149 of turbocharger 123 before entering air supply passage 143, which merges with medium pressure exhaust gas recirculation passage 163 in cooler 162. Cooler 162 empties into an inter compressor passage 146 that connects to compressor 148 of turbocharger 122. Compressor 148 may include corrosion resistant materials, such as titanium, to better resist any corrosive influence from the exhaust gas being recirculated. The compressed mixture of exhaust gas and fresh air leaves turbocharger 148 and enters exhaust gas recirculation passage 170, where it passes a lambda sensor 185 on its way to the engine intake passage via an air to air after cooler similar to that described with regard to the previous embodiment. As in the previous embodiment, throttle control valve 27 is controlled via electronic control module 129 via a communication line 131. Thus, the exhaust gas recirculation system 120 of the embodiment of FIG. 2 is simplified over that of the embodiment of FIG. 1 in that the ratios of exhaust gas to fresh air is controlled entirely by appropriately positioning throttle control valve 27, rather than by utilizing three valves as in the previous embodiment.

INDUSTRIAL APPLICABILITY

Those skilled in the art will recognize that, unlike conventional diesel engines, homogenous charge compression ignition engines may require substantially larger amounts of EGR in order to better facilitate operation across a broad range of speeds and loads of the engine. In fact, these EGR rates may exceed 50% of the gas being supplied to the intake of the engine. These extremely high levels of exhaust gas recirculation are typically not available in exhaust gas recirculation systems associated with conventional diesel engines. Thus, when engines 10 and 110 are operating in the highest portions of there load ranges, increased proportions of exhaust gas are supplied in the recirculation systems 20, 120 by throttling the fresh air intake valves 27 in order to promote the higher EGR levels. In the case of engine 10 at lower speeds and loads, throttle control valve 27 may be positioned in a fully opened condition, whereas the relative proportions of desired EGR are maintained by appropriately positioning control valves 26 and 28 associated with the low and high pressure exhaust gas passages, respectively. On the other hand, the engine of 110 controls the relative proportions of exhaust gas to fresh air by adjusting the position of throttle control valve 27 across the engines operating range.

Those skilled in the art will appreciate that exhaust gas can be useful in manipulating both ignition timing and the maximum pressure of a combustion event in a homogenous charge compression ignition engine. Because the chemical constituents of the exhaust typically are of higher heat capacity than those of pure air, increasing the percentage of inducted exhaust gas can serve as a heat sink to absorb combustion energy that might otherwise result in an extreme pressure spike. Thus, elevated levels of exhaust gas can reduce peak cylinder pressure and cylinder pressure rise rates, by slowing the combustion rate and retard ignition timing, which will allow for operation at ever higher loads. With all other things being equal, an increased percentage of inducted exhaust in the cylinder will also allow for an increased compression ratio for a given combustion phasing and vice versa. Thus, increased amounts of EGR can be used to retard ignition timing, whereas reduced EGR rates can be utilized to advance ignition timing. Thus, varying amounts of exhaust gas recirculation coupled with a variable compression ratio device and/or the variable intake valve actuator can provide three useful control levers for adjusting ignition timing and maximum cylinder pressure across a wide range of operating conditions.

Those skilled in the art will also appreciate that some attention should be paid to balancing the desire to boost intake pressure by extracting energy from the exhaust gases via turbocharger(s), verses routing exhaust gas for recirculation prior to extracting all of the potential energy therefrom. This issue is addressed in the engines 10 and 110 by including staged turbochargers 122 and 123 in series with one another. However, the present disclosure contemplates a single turbocharger for the engine or possibly two or more turbochargers in series and/or parallel with an appropriate arrangement that allows for sufficient intake boost pressure while allowing for increased exhaust gas recirculation rates associated with homogeneous charge compression ignition operation at higher speeds and loads. Those skilled in the art will appreciate that all of the strategies disclosed above for varying cylinder pressures and cylinder pressure rise rates are closely coupled. Thus, one might wish to rely largely on the variable compression ratio device for bulk changes in compression ratio, rely upon varying amounts of EGR to adjust ignition timing, and may rely upon variable intake valve actuator for quick adjustments from cycle to cycle and to adjust for differences among the cylinders in their behavior. Nevertheless, the control inputs can be mixed and utilized as desired to achieve a desired response time and arrive at a new operating condition with sufficient control capabilities available to operate the engine in any desired fashion.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of operating an engine, comprising the steps of:
   mixing high and low pressure exhaust from upstream and downstream, respectively, of a turbocharger via a venturi connection:
   supplying a mixture of exhaust and fresh air to a combustion chamber of the engine;
   injecting liquid fuel into the combustion chamber prior to an auto-ignition condition of the fuel;
   mixing the fuel with the exhaust/air mixture in the combustion chamber;
   compressing the fuel/air/exhaust mixture through an auto-ignition condition of the fuel;
   increasing a proportion of exhaust gas supplied to the combustion chamber by throttling a fresh air supply passage.

2. The method of claim 1 including a step of compressing a mixture of fresh air and low pressure exhaust in the turbocharger prior to mixing with the high pressure exhaust.

3. The method of claim 2 including trapping particles in the low pressure exhaust prior to mixing with fresh air;
   cooling the low pressure exhaust prior to mixing with fresh air;
   trapping particles in the high pressure exhaust prior to mixing with the mixture of low pressure exhaust and fresh air;
   cooling the high pressure exhaust prior to mixing with the mixture of low pressure exhaust and fresh air; and
   cooling the mixture of low pressure exhaust, high pressure exhaust and fresh air.

4. The method of claim 1 wherein the injecting step is performed in a shower head spray pattern that includes spray plumes at a plurality of angles with respect to an injector centerline.

5. The method of claim 1 wherein the injecting step is performed during a compression stroke of the combustion chamber.

6. The method of claim 1 including a step of adjusting a relative ratio of low to high pressure exhaust recirculated to the combustion chamber.

7. The method of claim 1 wherein the turbocharger is a first turbocharger; and
   channeling exhaust from the first turbocharger to a second turbocharger;
   the low pressure exhaust is from an outlet from the second turbocharger.

8. An engine comprising:
   an engine housing having at least one combustion chamber disposed therein;
   a fuel injector positioned for direct injection of liquid fuel into each combustion chamber;
   an exhaust passage extending between the engine housing and a turbocharger;
   a high pressure exhaust gas recirculation passage connected to the exhaust passage;
   at least one outlet from the turbocharger with a first branch connected to a low pressure exhaust gas recirculation passage, and a second branch connected to a tail pipe;
   a fresh air supply passage connected to the low pressure exhaust gas recirculation passage;
   a venturi connection fluidly connecting the low pressure exhaust gas recirculation passage with the high pressure exhaust gas recirculation passage;
   a throttle control valve positioned in the fresh air supply passage; and
   an engine controller configured to inject fuel prior to an auto-ignition of the fuel and then to compress a mixture of fuel with air and exhaust gas in the combustion chamber to the auto-ignition condition of the fuel, and configured increase a proportion of exhaust gas supplied to the combustion chamber by actuating the throttle control valve.

9. The engine of claim 8 wherein the turbocharger is a first turbocharger; and
   a second turbocharger arranged in series with the first turbocharger.

10. The engine of claim 9 wherein each of the low pressure and high pressure exhaust gas recirculation passages includes a respective particle trap; and
    a cooler positioned downstream from the venturi connection.

11. The engine of claim 8 wherein the fuel injector has a shower head nozzle with outlets oriented at a plurality of different angles with respect to an injector centerline.

12. The engine of claim 8 including a first control valve positioned in the low pressure exhaust gas recirculation passage; and
 a second control valve positioned in the high pressure exhaust gas recirculation passage.

13. The engine of claim 12 wherein the exhaust gas recirculation system includes a cooler positioned downstream from the venturi connection for cooling a mixture of exhaust from the low pressure exhaust gas recirculation passage and the high pressure exhaust gas recirculation passage.

* * * * *

UNITED STATES PATENT AND TRADEMARK OFFICE
CERTIFICATE OF CORRECTION

PATENT NO. : 7,377,270 B2  Page 1 of 1
APPLICATION NO. : 11/584889
DATED : May 27, 2008
INVENTOR(S) : Duffy et al.

It is certified that error appears in the above-identified patent and that said Letters Patent is hereby corrected as shown below:

Please correct the Claim as follows:
Column 7, line 56, in claim 1, delete "connection:" and insert -- connection; --.

Signed and Sealed this

Twenty-first Day of October, 2008

JON W. DUDAS
*Director of the United States Patent and Trademark Office*